United States Patent
Rocha

[19]

[11] Patent Number: 6,142,783
[45] Date of Patent: Nov. 7, 2000

[54] HANDWRITING TEMPLATE SYSTEM

[76] Inventor: Manuel Antonio Rocha, Rua dos Ferreiros, 181 SE, 9000 Funchal, Madeira Island, Portugal

[21] Appl. No.: 09/436,175

[22] Filed: Nov. 8, 1999

[51] Int. Cl.[7] .............................. G09B 11/04; G09B 11/00
[52] U.S. Cl. .......................... 434/164; 434/162; 434/165
[58] Field of Search .................................. 434/162, 163, 434/164, 165, 159

[56] References Cited

U.S. PATENT DOCUMENTS

| | | | |
|---|---|---|---|
| 2,277,329 | 3/1942 | Kimbrough | 434/164 |
| 2,456,632 | 12/1948 | Greenberg | 434/164 |
| 3,512,273 | 5/1970 | Baker | 434/163 |
| 3,731,402 | 5/1973 | Paul | 434/164 |
| 3,740,872 | 6/1973 | Mayo | 434/164 |
| 4,470,197 | 9/1984 | Pagalies | 434/164 |
| 4,664,633 | 5/1987 | Garda | 434/164 |
| 4,669,986 | 6/1987 | Yokoyama | 434/164 |
| 4,846,688 | 7/1989 | Jones | 434/164 |
| 4,960,382 | 10/1990 | Alford | 434/164 |
| 5,000,688 | 3/1991 | Clamp | 434/164 |
| 5,027,523 | 7/1991 | MacLeod | 33/564 |
| 5,203,706 | 4/1993 | Zamir | 434/163 |
| 5,516,291 | 5/1996 | Miyake | 434/164 |

FOREIGN PATENT DOCUMENTS

| | | | |
|---|---|---|---|
| 762962 | 4/1934 | France | 434/164 |

*Primary Examiner*—Jacob K. Ackun
*Assistant Examiner*—Kurt Fernstorm
*Attorney, Agent, or Firm*—Michael I Kroll

[57] ABSTRACT

The present invention discloses a device 10 used for teaching people to properly write letters, numbers and various geometric shapes. It consists of templates 12 displaying the various letters, numbers and shapes which as placed over a piece of paper 16 inside a guide form or template holder 14 so that the sheet of paper 16 is held between the template 12 and the template holder 14. Each template 12 has a number of rows and columns on it so that in the first column the imprinted letter 24 to be written is shown, in the second column the stencil 26 of the letter or number to be written is shown and to the right blank spaces 28 are provided so the user can practice his writing. In addition, a template 52 having varying sizes of blank boxes 28 is provided allowing one to practice the letters in various sizes.

4 Claims, 16 Drawing Sheets

HANDWRITING TEMPLATE SYSTEM

BACKGROUND OF THE INVENTION

1. Field of the Invention

The present invention relates generally to educational devices and, more specifically, to a system having a plurality of templates whereby a user selects a template and inserts the template into the template holder and after inserting a sheet of paper between the template and template holder proceeds to practice their handwriting.

Each template, with the exception of one, having a number of columns and rows, each first column of said templates has a figure imprinted on each row, each second column has a stencil of the figure in the corresponding row wherein the user would practice following the stencil until such time selected by the user to practice writing the figures in the following corresponding rows each having a box of similar size as the imprinted and stencil boxes and each of the boxes having a number lines imprinted around the edges to aid the user in sizing the figures to the boxes.

The templates for the alphabet have four rows for each letter whereupon is printed in the first column an uppercase block letter, a lowercase block letter, an uppercase script letter and a lowercase script letter. Also included with the alphabetic templates is a number template for the ten digits; a special geometric figure template; a vowel template having two rows for each vowel, a lowercase block letter and a lowercase script letter; and a universal template having various sized boxes for various sizes of the figures.

2. Description of the Prior Art

There are other educational devices designed to aid in the practice of letter formation. Typical of these is U.S. Pat. No. 3,731,402 issued to Paul on May 8, 1973.

Another patent was issued to Strohl on Jun. 2, 1970 as U.S. Pat. No. 3,514,874. Yet another U.S. Pat. No. 2,499,838 was issued to Smith on Mar. 7, 195. Still yet another was issued on Mar. 2, 1920 to Sargent as U.S. Pat. No. 1,332,761 and another was issued to Radley on Apr. 1, 1884 as U.S. Pat. No. 295,941.

An educational device including a base plate, a front frame having its left edge secured to the left edge of the base plate and a roll having paper thereon secured to the upper end of the base plate which roll is provided with a knob which a pupil may rotate with one hand while he pulls while he pulls the free end of the paper downwardly between the base plate and the frame. The front frame is provided with an elongated opening for receiving a slide having letters or numerals stenciled therein. The slide may be formed of a single piece or a plurality of connected segments which slide is held stationary within the frame by suitable means, such as by beveled edges which engage beveled edges at the openings in the front frame. The stencil is preferably formed of a plastic material having a thickness of 0.05 to 0.06 of an inch so that in forming letters or numerals, the pencil will allow a definite pattern. If desired, small numerals may be etched or printed upon the stencil adjacent each letter or numeral to show the progressive strokes of the pencil which are utilized in forming the letters or numerals.

A writing guide for use with sheets of various types of paper, such as translucent unruled sheets of stationary, as a guide for obtaining proper margins, straight lines across the sheet, lateral positioning and vertical alignment of indentations, etc. it preferably consists of a platen or flat board providing a supporting surface on which the sheet is positioned and which is provided with a border or frame for overlapping the edges of the sheet on its two sides and top and bottom, the overlap being such as to provide the desired margins on the sheet when the writing is confined to the exposed upper face of the sheet as well as to grip and hold the sheet firmly but releasably. The platen is provided with horizontal and vertical guide lines and other indicia which show through the sheet to help the writer keep straight lines and vertical alignment of paragraph and other indentations as well as to locate other areas. Also, the inner edge of the frame or border may be provided with notches for locating page numbers or the like and which are located in a selected manner relative to the grid provided on the platen by the horizontal and vertical lines.

This United States Patent discloses a template strip for forming all the letters of the alphabet comprising a continuously repeated sequence of perforated and special-shaped character-forming portions arranged alternately along the strip, said perforated portions containing two parallel rows of correspondingly spaced apertures, said special-shaped portions each containing three adjacent joined members, one of said members comprising a vertical leg transverse with respect to the strip and a sidewise disposed U-shaped element, whereby said member is substantially P-shaped, another of said members comprising an outer circular element and an inner circular element contained within and tangent to the outer circular element, and the third of said members comprising two inclined legs meeting at an apex and a horizontal connecting bar joining said legs.

This United States Patent discloses a plate or stencil by means of which persons may be taught the proper formation of letters and the hand trained and guided in such formation. The patent also discloses a novel means of holding the stencil in position over a paper pad or slate thus preventing the stencil from slipping, but permitting its ready removal for the purposes of viewing the written work said holding means comprised of a flange on one side of said stencil and a plate having a number of slots for the insertion of and fastening thereto a number of nuts and bolts and wherein said plate forms a right angle with the stencil wherein the pad or slate will reside with said right angle.

While these educational devices may be suitable for the purposes for which they were designed, they would not be as suitable for the purposes of the present invention, as hereinafter described.

SUMMARY OF THE PRESENT INVENTION

The present invention discloses a device used for teaching people to properly write letters, numbers and various geometric shapes. It consists of templates displaying the various letters, numbers and shapes which are placed over a piece of paper inside a guide form or template holder so that the sheet of paper is held between the template and the template holder. Each template has a number of rows and columns on it so that in the first column the imprinted letter to be written is shown, in the second column the stencil of the letter or number to be written is shown and to the right blank spaces are provided so the user can practice his writing. In addition, a template having varying sizes of blank boxes is provided allowing one to practice the letters in various sizes.

A primary object of the present invention is to provide a means of practicing the formation of upper and lower case letters in block and script format.

Another object of the present invention is to provide a device which will allow an individual to insert a piece of paper and select a template for the alphabet, vowels, geometric shapes, or numbers and insert the selected template into the device which will allow the individual to trace an object in the first column, practice using the formed object in the second column and finally to practice within a plurality of structured boxes having a plurality of guide lines on each edge of the box.

Additional objects of the present invention will appear as the description proceeds.

The present invention overcomes the shortcomings of the prior art by providing a guide form which will hold a plurality of paper and wherein a user selected template will be inserted whereby an individual can practice forming figures for the alphabet, numbers, geometric shapes and varying the size using the universal template as well as learning and practicing the vowels of the alphabet by using the vowel template.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to the reference numerals used, the following numbering is used throughout the various figures.

10 present invention
12 template
14 guide form
15 lines
16 paper
18 writing surface
20 overhanging edge
22 vowel template
24 imprinted letters
26 letter stencil
28 blank space
30 imprinted numbers
32 number stencil
34 geometric shape template
36 imprinted geometric shapes
38 geometric shapes stencil
40 alphabet template
42 block capital letter
44 script capital letter
46 block lowercase letter
48 script lowercase letter
50 letter stencil
52 blank boxes

DESCRIPTION OF THE PREFERRED EMBODIMENT(S)

Turning now descriptively to the drawings, in which similar reference characters denote similar elements throughout the several views, FIGS. 1 through 16 illustrate the present invention being a means for teaching and improving handwriting.

Figure 1:
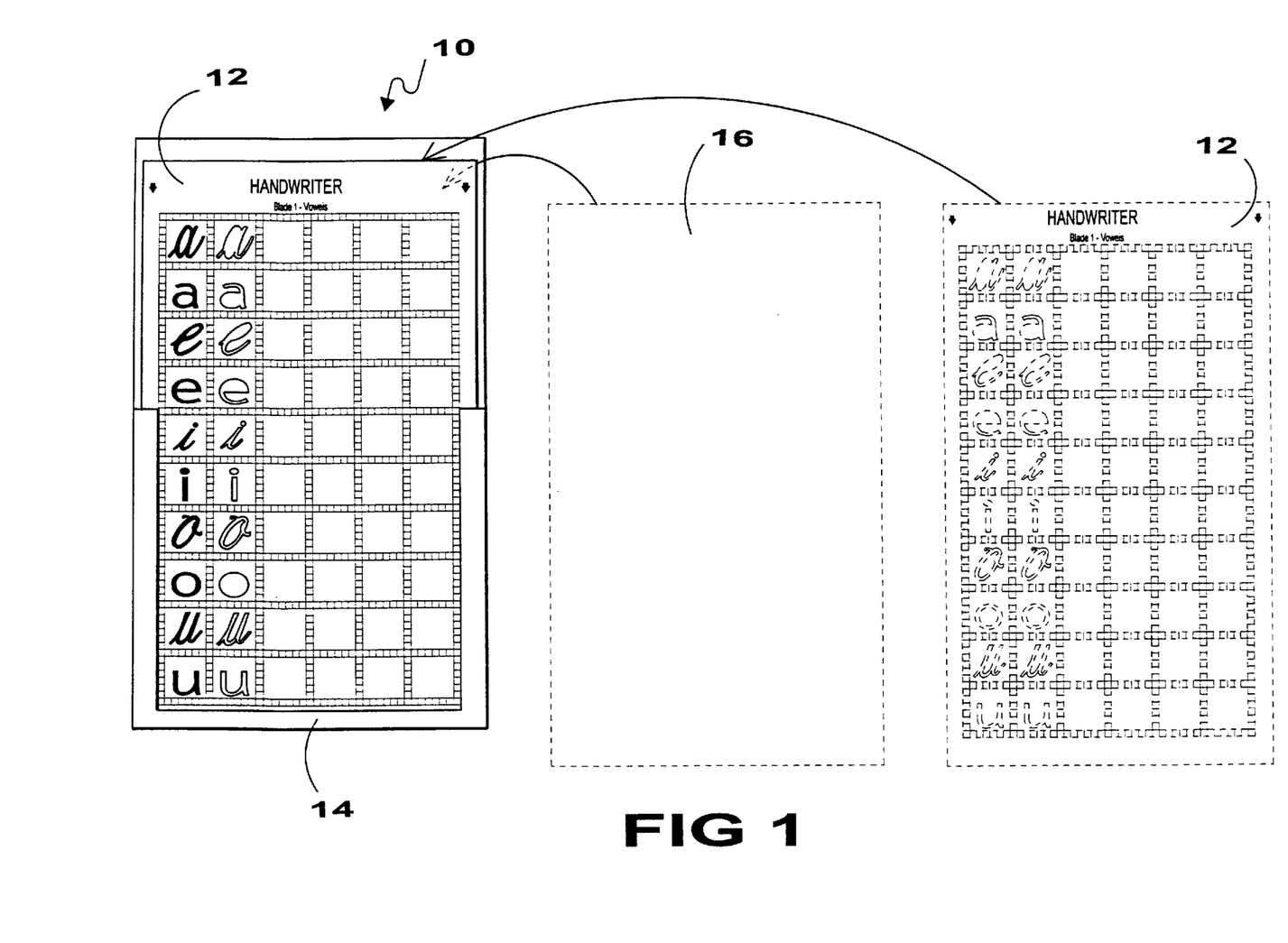
FIG. 1 is a perspective view of the present invention in use.

Turning to FIG. 1, therein is shown a perspective view of the present invention 10 in operative connection. Shown therein is a handwriting template 12, the guide form 14, and a piece of paper 16. As can be seen the template 12 is inserted in the guide form so that the piece of paper 16 to be written on is located underneath the template 12 and on top of the guide form or template holder 14 which serves as a smooth, flat writing surface. As shown, template 12 has a number of rows and columns on it containing the vowels a, e, i, o, and u, written in lowercase script form and lowercase block or non-script form. In the left column the letters are imprinted, in the second column there is a stencil of the letters, and in the remaining columns are blank boxes. In operation, the user would view the properly written letter in the first column and then practice writing the letter by following the stencil until the user could write the letter in the blank boxes provided. Note that the boxes have lines 15 imprinted around the edges to aid the user in properly sizing the letters to the boxes. This procedure is followed for all of the templates.

Figure 2:
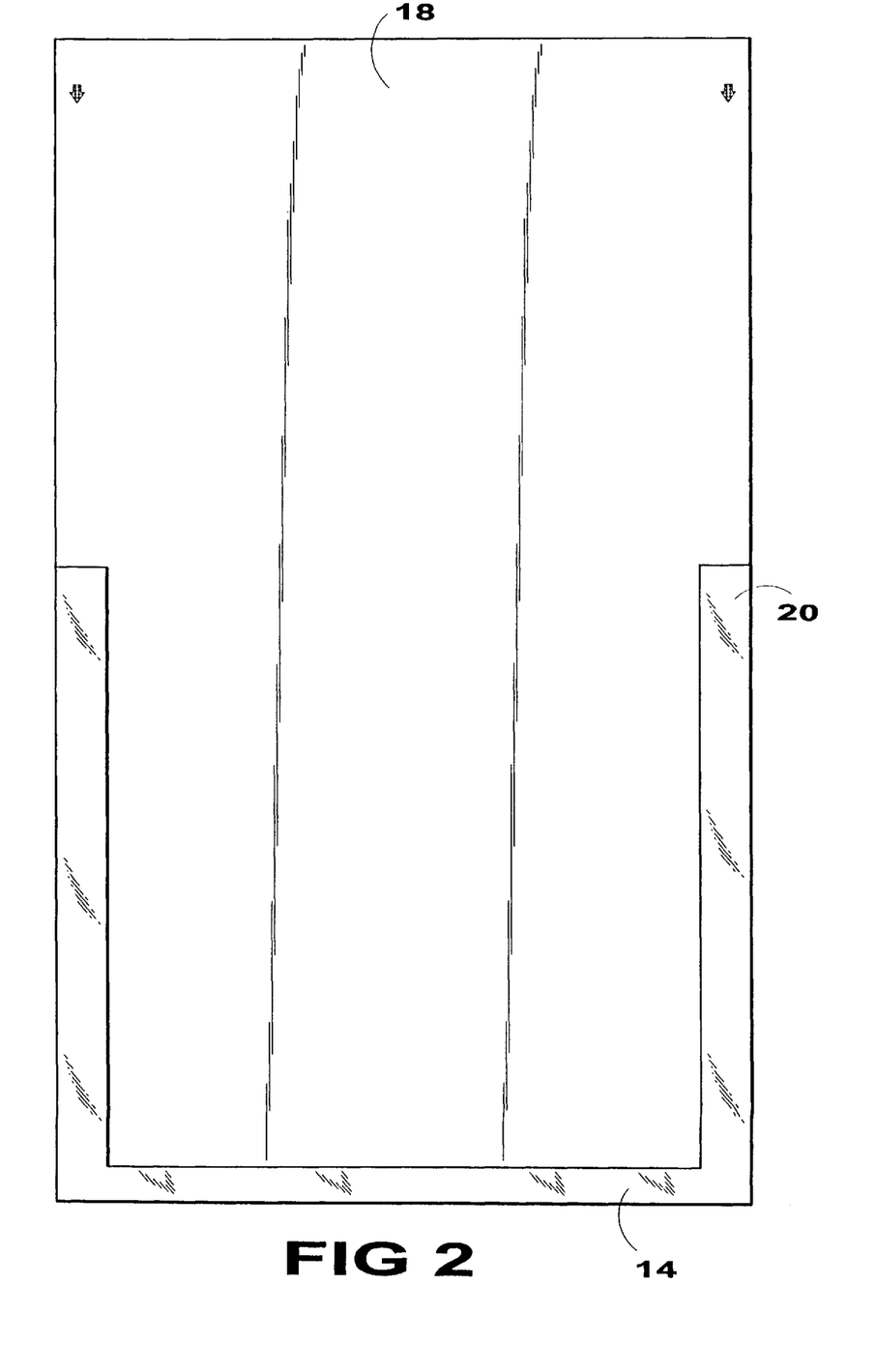
FIG. 2 is a top plan view of the guide form which is used to hold a piece of paper and the selected template while being used.

Turning to FIG. 2, therein is shown a top plan view of the guide form 14 which is used to hold the piece of paper and selected template while the template and paper are in use. As can be seen, the guide form 14 has a flat writing surface 18 along with overhanging edges 20 which extend around its periphery on its lower approximate one-half so as to provide a means for holding the paper and template.

Figure 3:
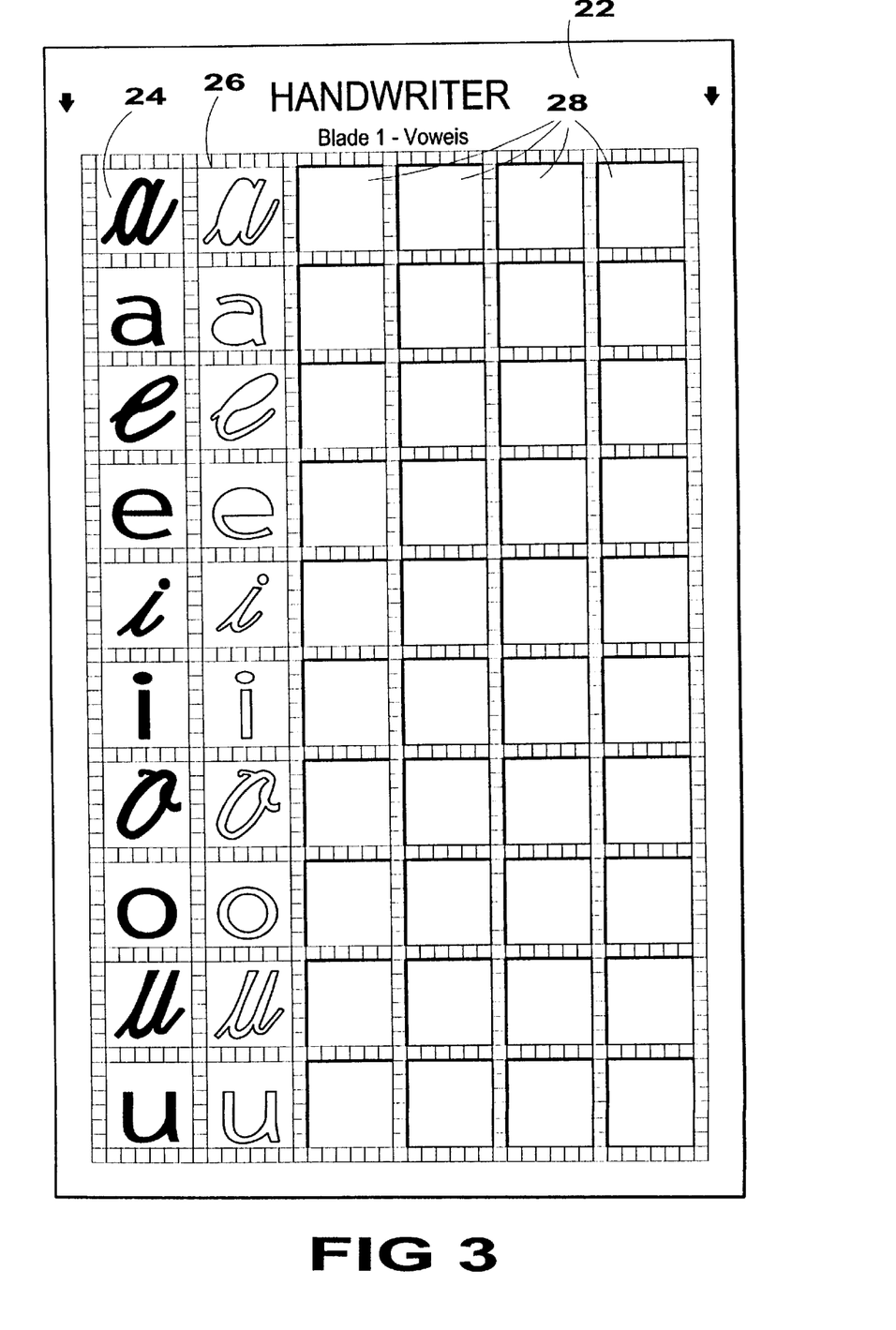
FIG. 3 is a top plan view of the vowel template of the present invention.

Turning to FIG. 3, therein is shown a top plan view of the vowel template 22 of the present invention 10. Shown therein is a series of rows and columns with the left column being a series of imprinted FIGS. 24. The second column 26 being a stencil outlining each vowel and then 28, being blank spaces wherein the user can practice writing the particular letter.

Figure 4:
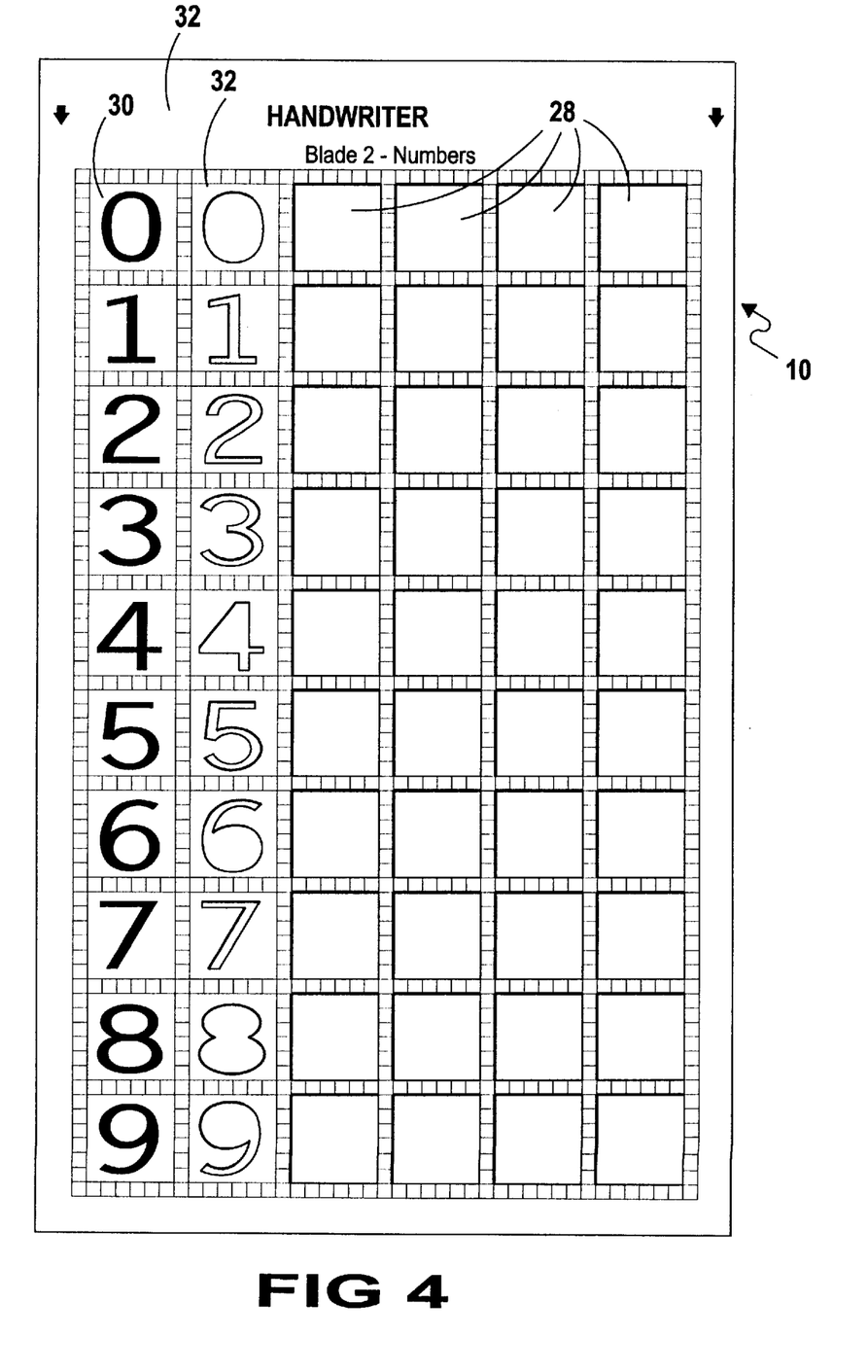
FIG. 4 is a top plan view of the number template of the present invention.

Turning to FIG. 4, therein is shown a top plan view of the number template 32 of the present invention 10 providing the numbers 0–9. Shown therein in the first column are the imprinted letters 30 and in the second column are shown the letter stencil 32 and then blank spaces 28 are provided to write wherein the numbers can be written.

Figure 5:
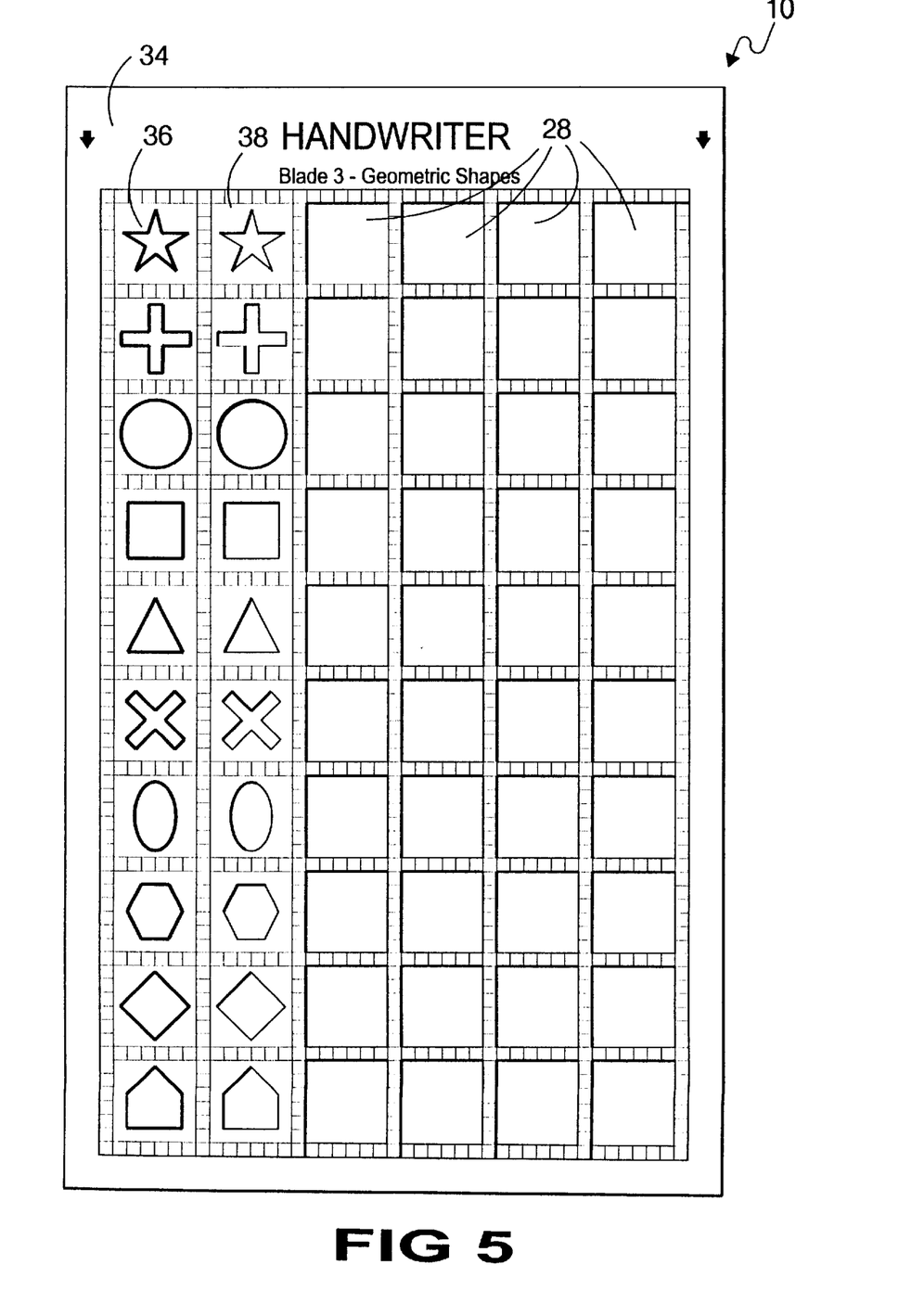
FIG. 5 is a top plan view of the geometric shape template of the present invention.
Figure 6:
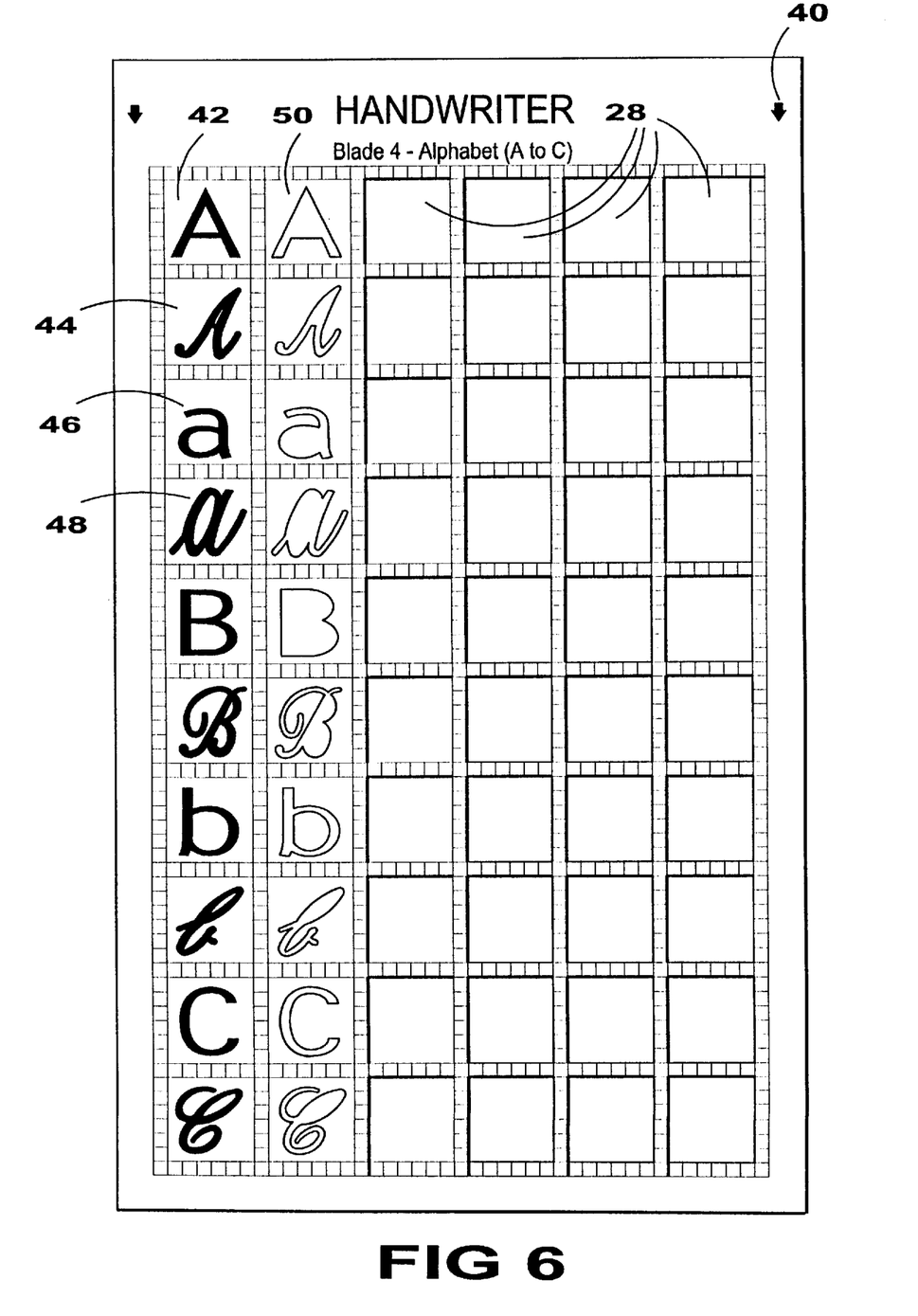
FIG. 6 is a top plan view of the alphabet template for the letters A to C of the present invention.
Figure 7:
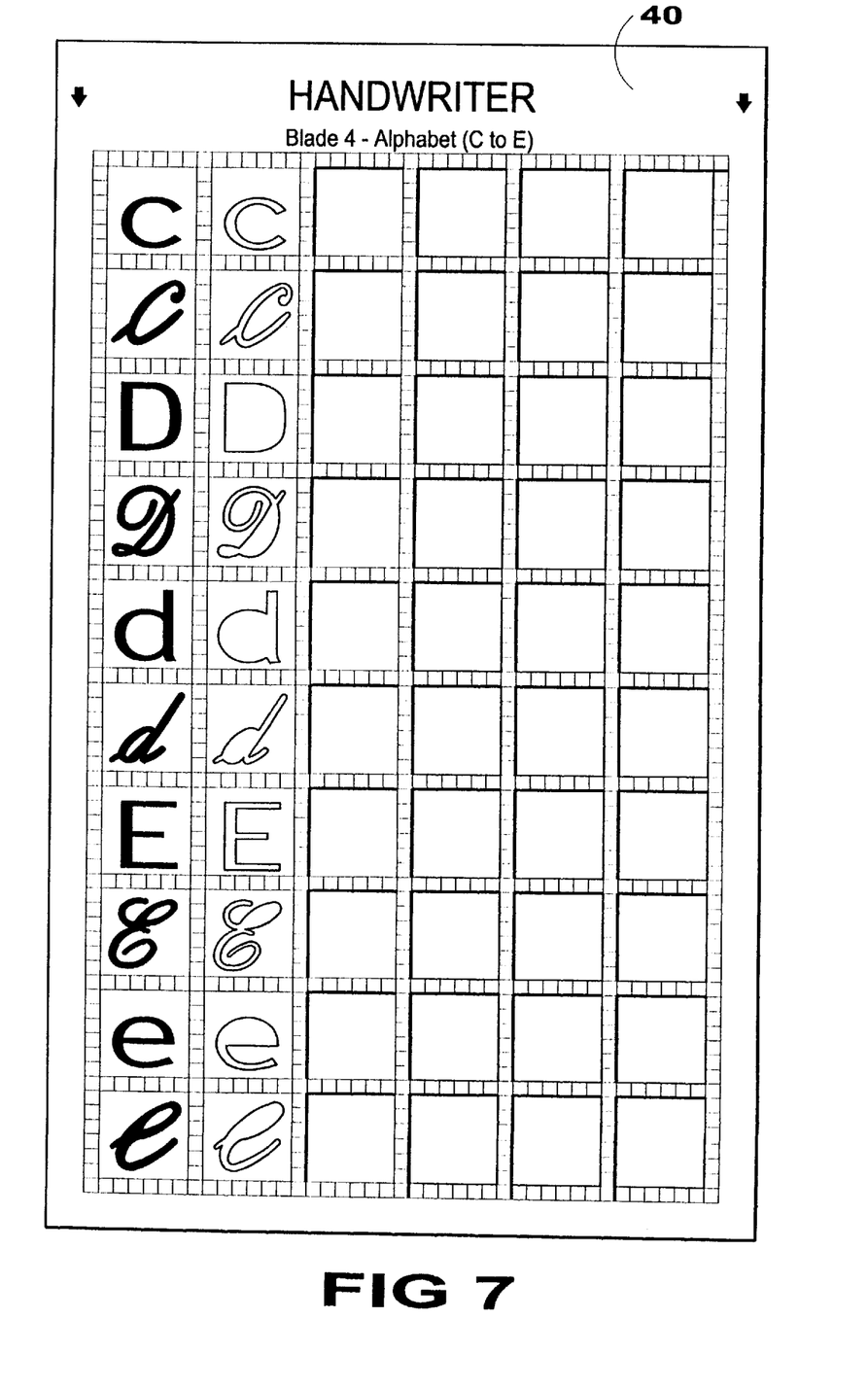
FIG. 7 is a top plan view of the alphabet template for the letters C to E of the present invention.
Figure 8:
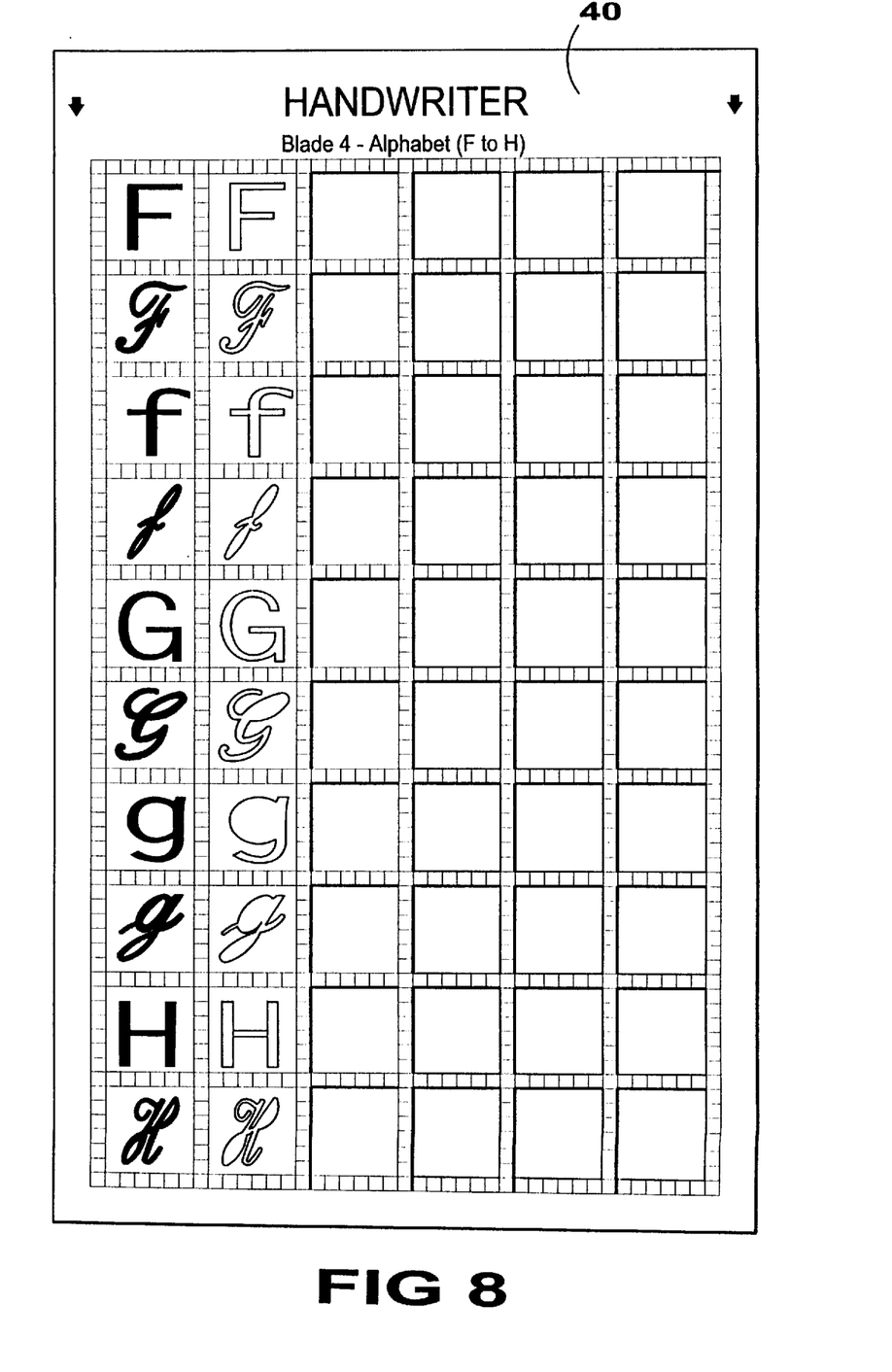
FIG. 8 is a top plan view of the alphabet template for the letters F to H of the present invention.
Figure 9:
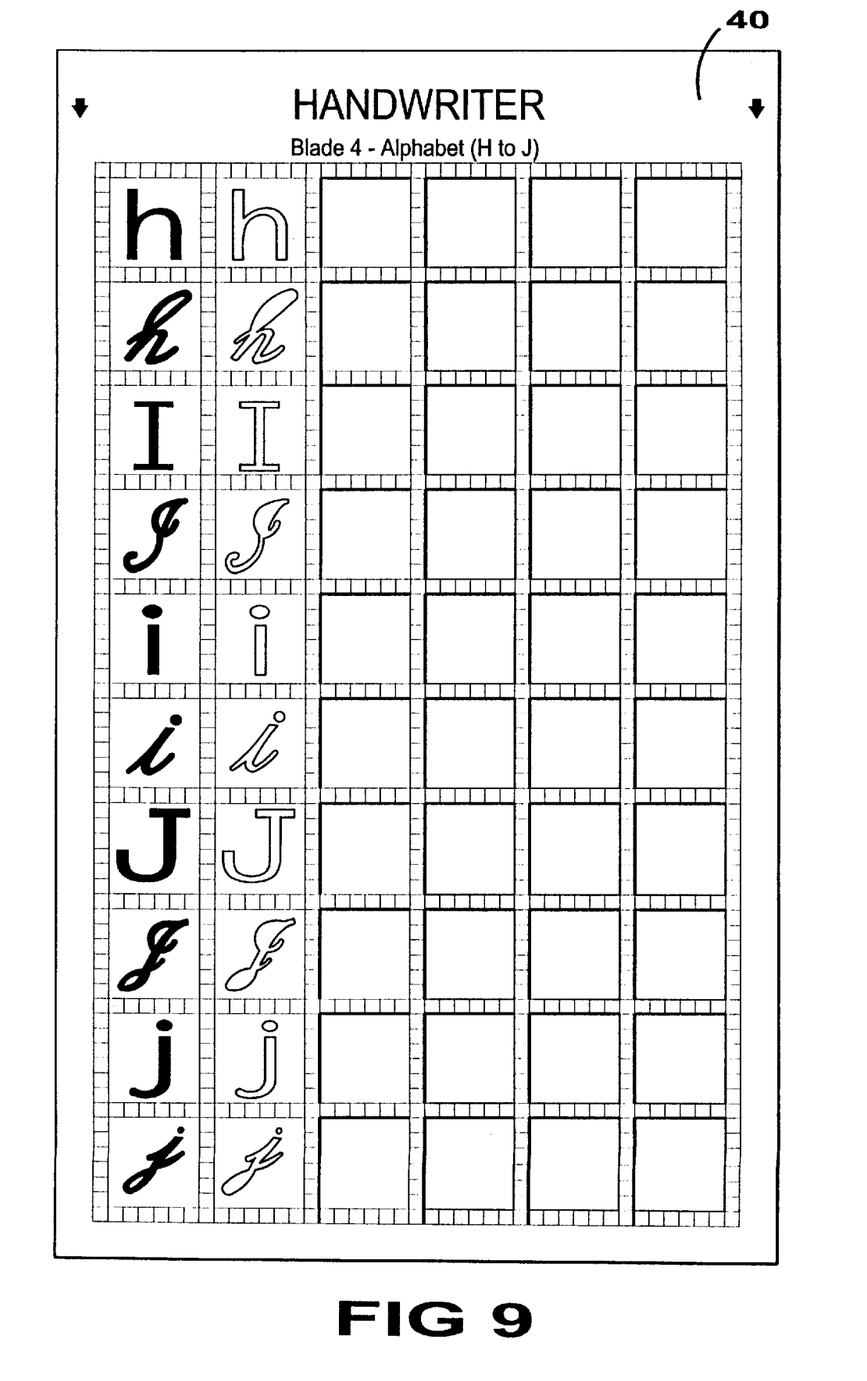
FIG. 9 is a top plan view of the alphabet template for the letters H to J of the present invention.
Figure 10:
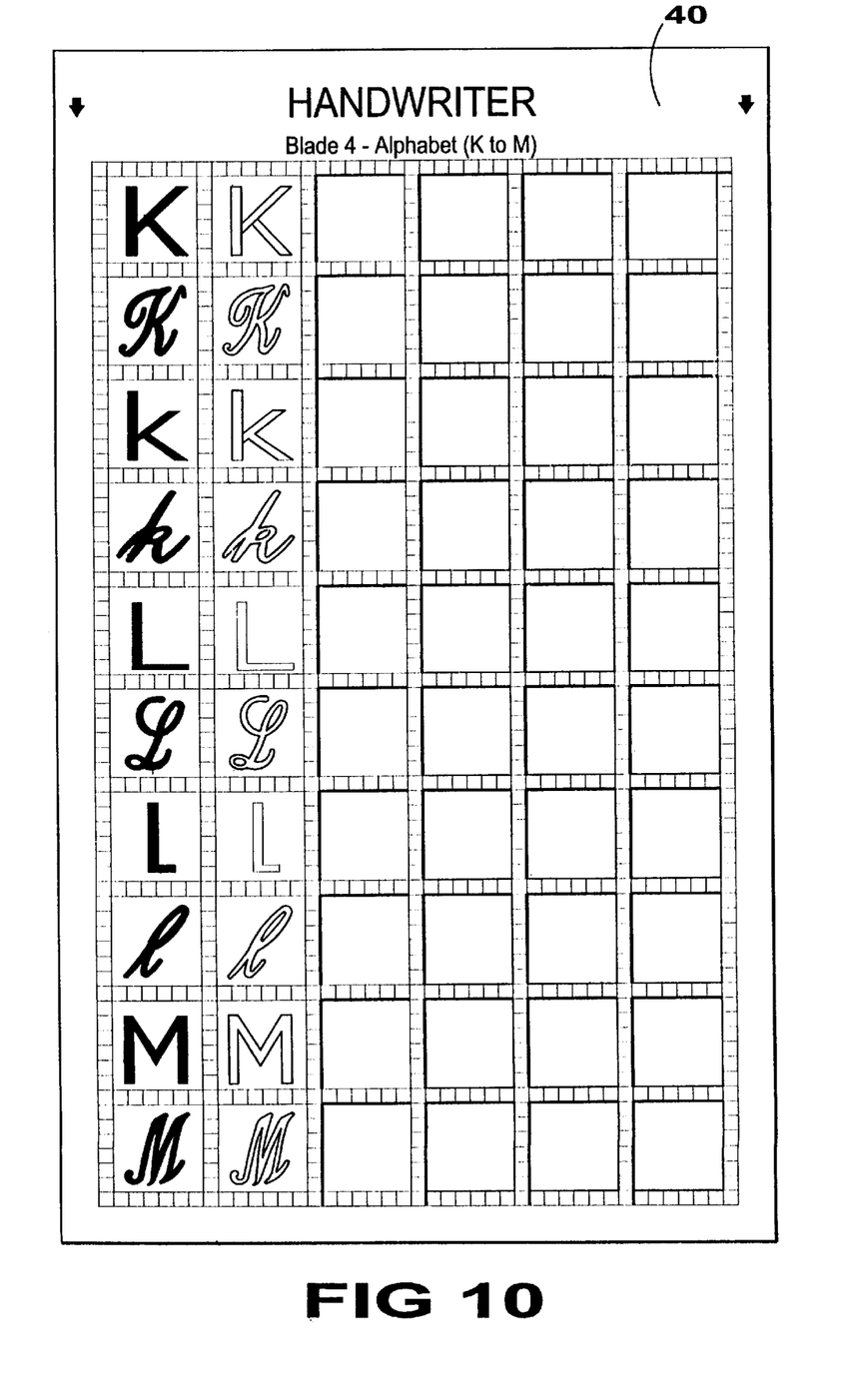
FIG. 10 is a top plan view of the alphabet template for the letters K to M of the present invention.
Figure 11:
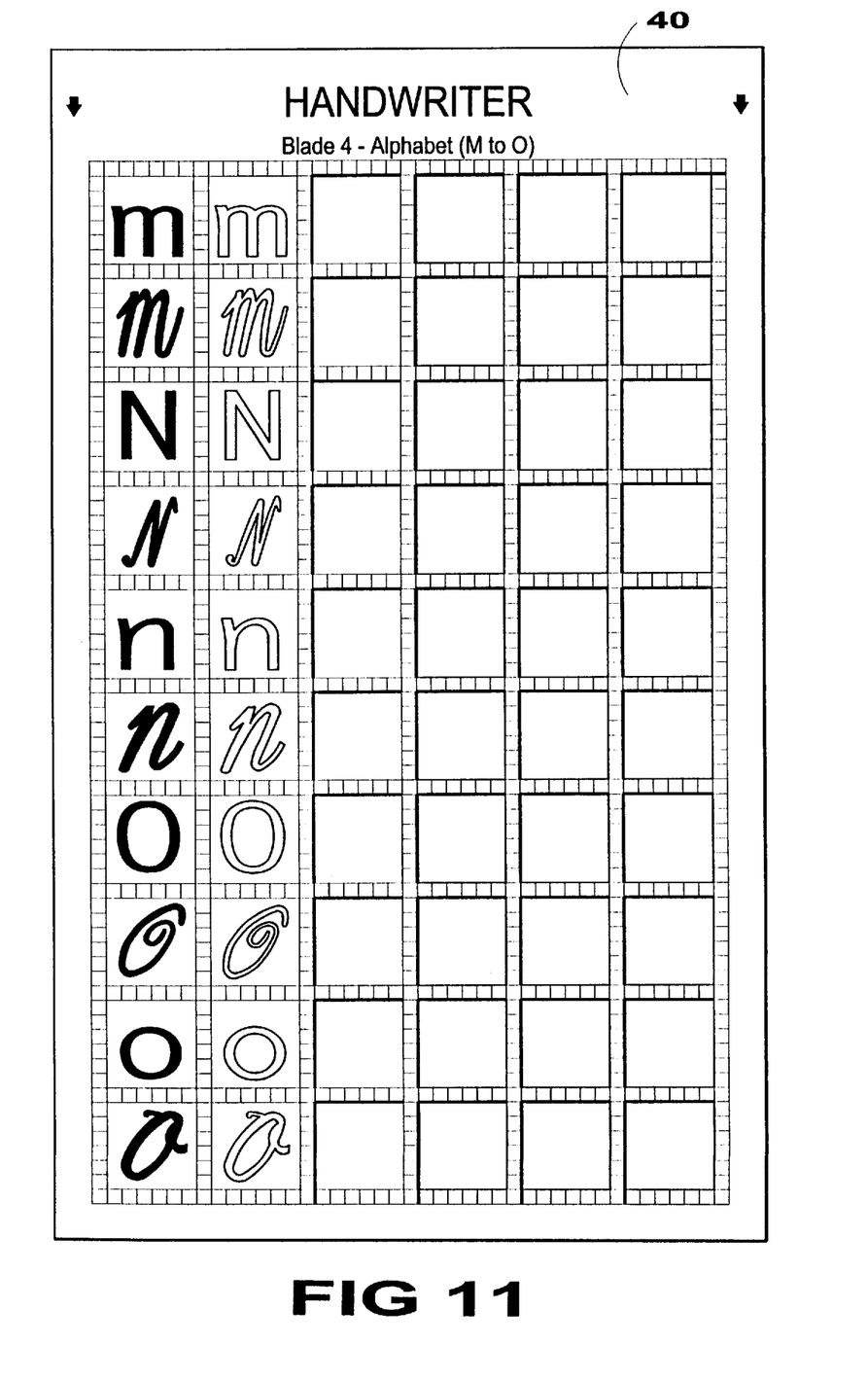
FIG. 11 is a top plan view of the alphabet template for the letters M to O of the present invention.
Figure 12:
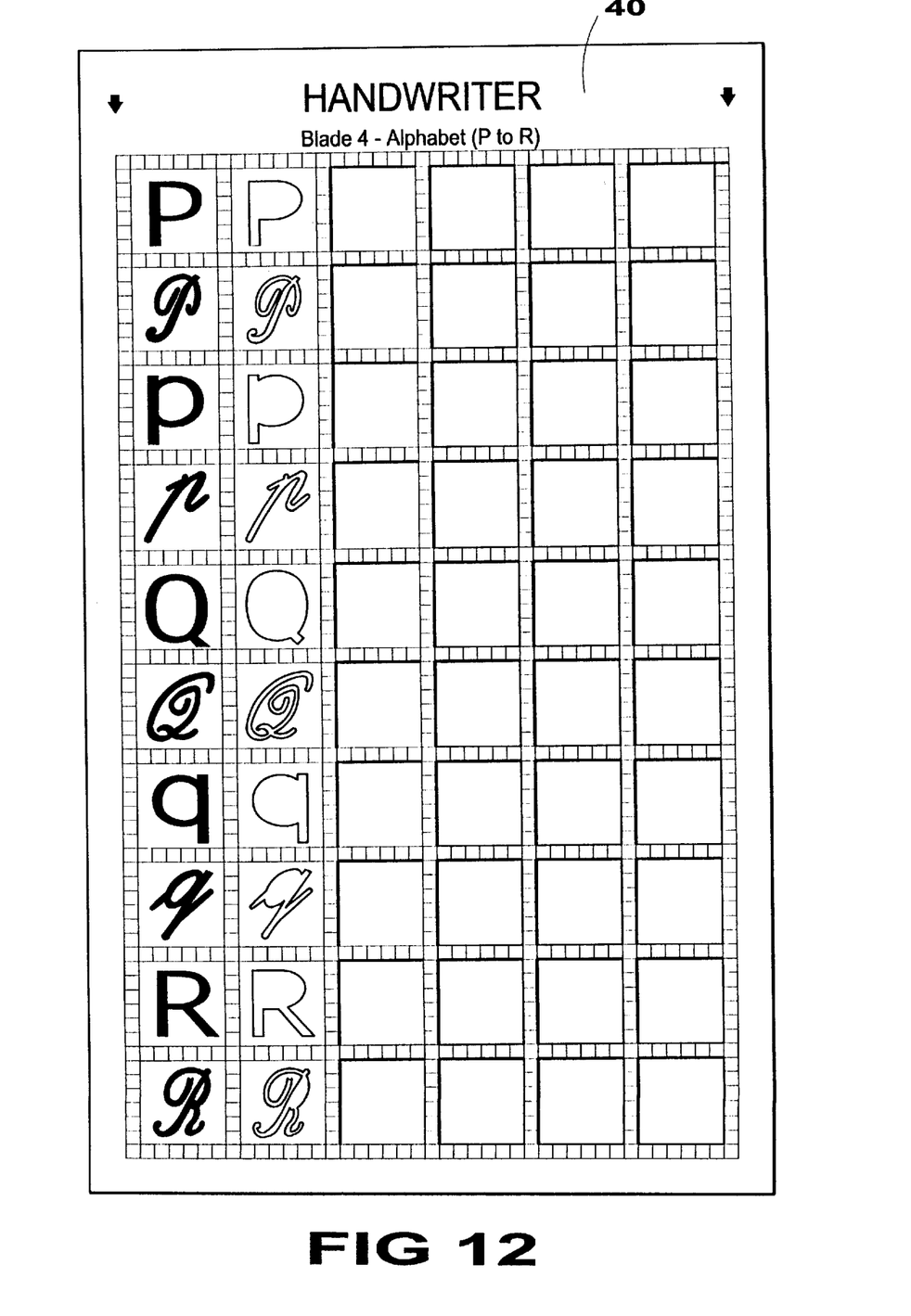
FIG. 12 is a top plan view of the alphabet template for the letters P to R of the present invention.
Figure 13:
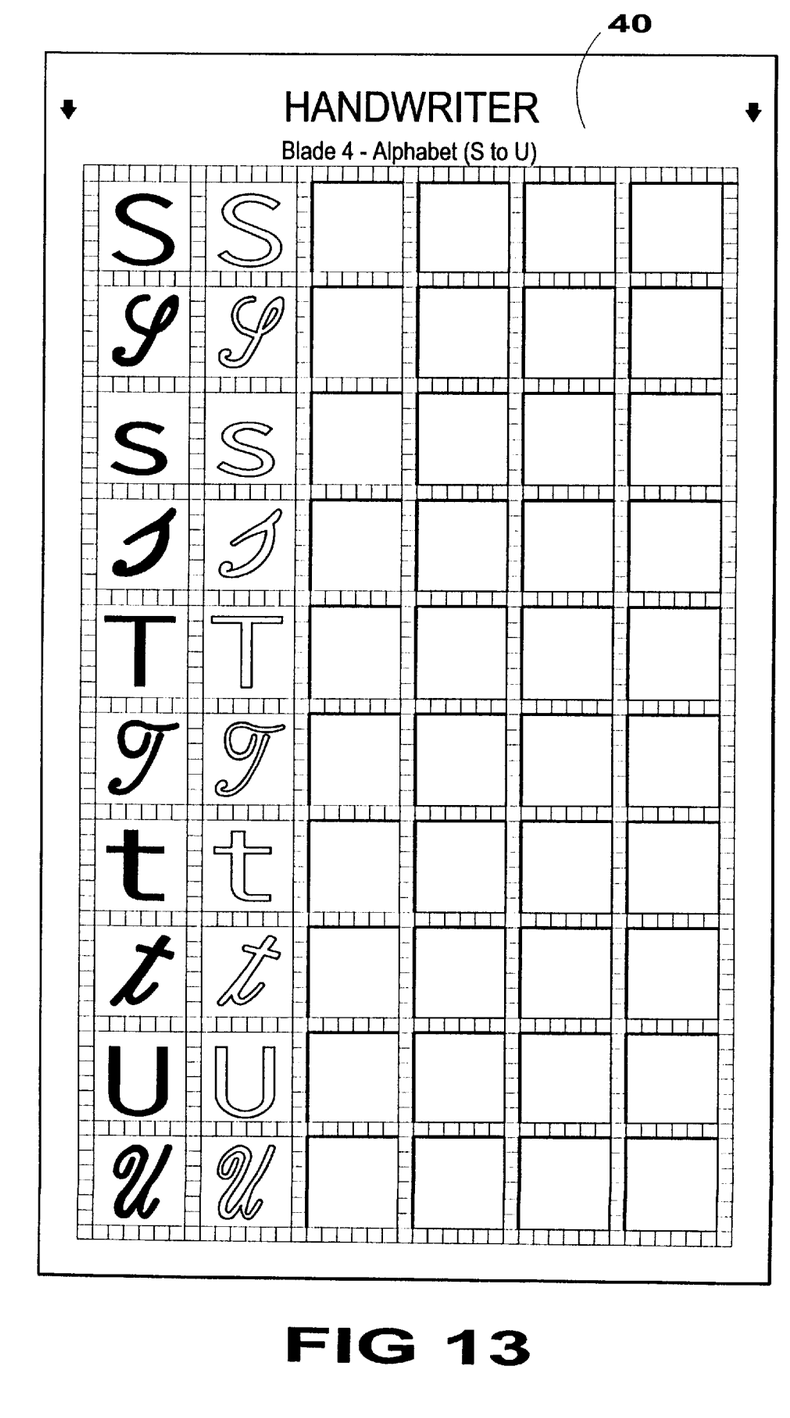
FIG. 13 is a top plan view of the alphabet template for the letters S to U of the present invention.
Figure 14:
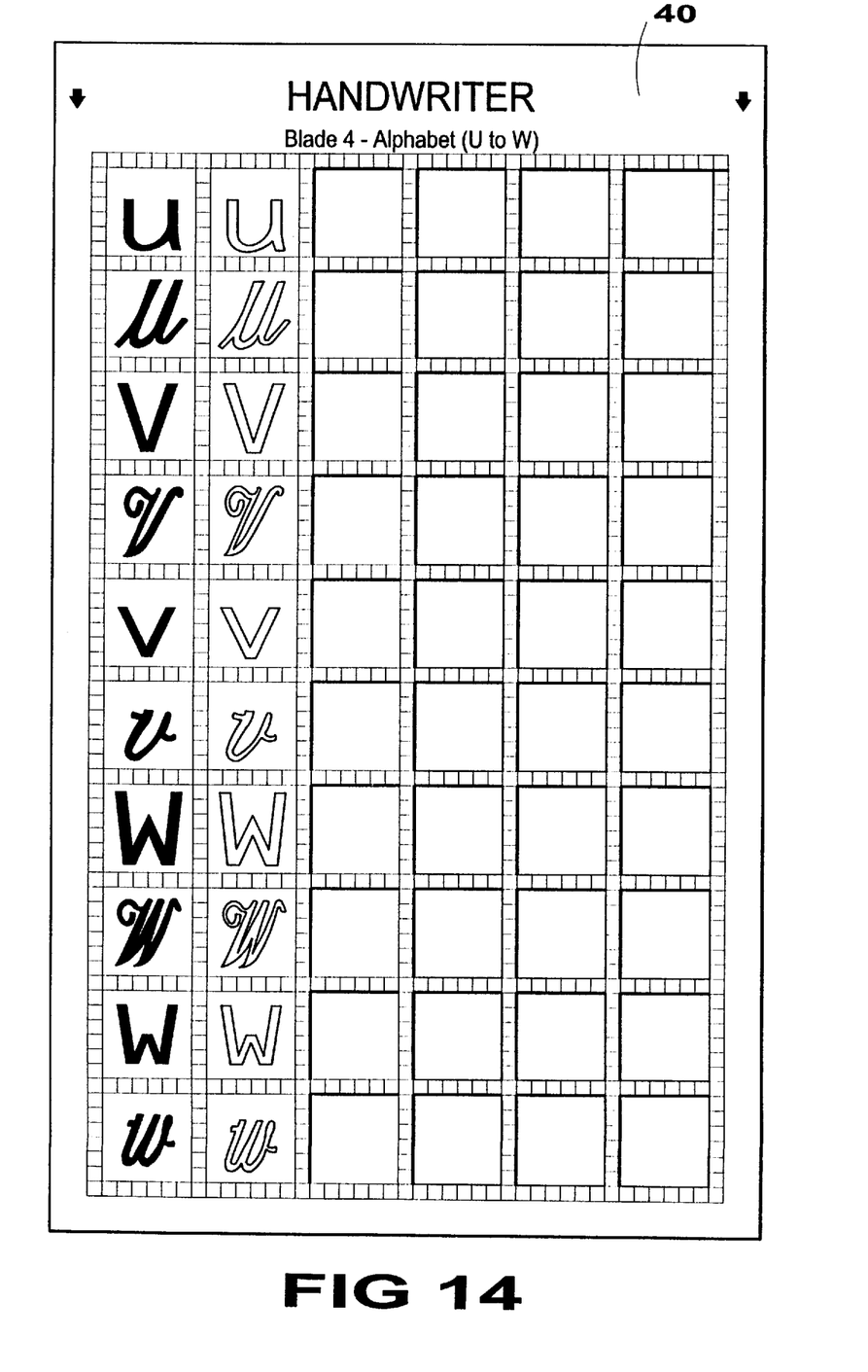
FIG. 14 is a top plan view of the alphabet template for the letters U to W of the present invention.
Figure 15:
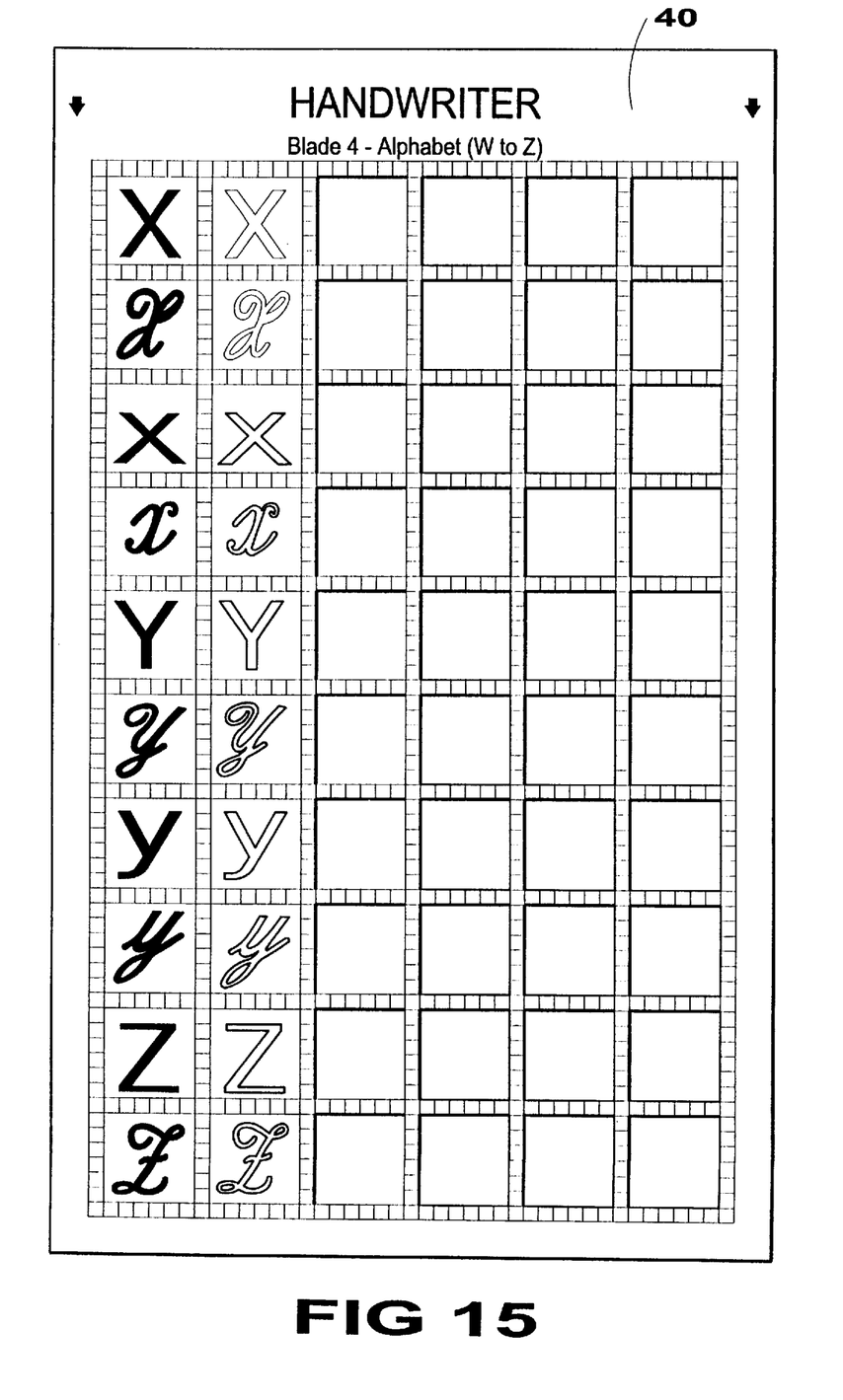
FIG. 15 is a top plan view of the alphabet template for the letters W to Z of the present invention.

Turning to FIG. 5, therein is shown a top plan view of the geometric shape template 34 of the present invention 10. Shown in the left column are various selected imprinted geometric shapes 36. In the second column the stencils 38 for the geometric shapes are shown and then blank spaces 28 are provided to the right.

Turning to FIGS. 6–15, therein is shown a top plan view of the alphabet templates 40 for all of the letters A to Z of the alphabet. Shown therein in the first column is the capital letter "A" 42 in block form. Underneath that is shown the script capital letter "A" 44. Underneath that a lower block case letter "a" 46 and then underneath that a lowercase script letter "a" 48. In the second column are shown the stencils corresponding to the printed letters in the first column. In the next column are shown the blank spaces 28 wherein the letters can be written. The same order of presenting all the letters of the alphabet are used in FIGS. 6–15. In each case an upper case block and script letter, and a lower case block and script letter are presented followed by a second column of stencils and then four columns of blank spaces. In each case, the user practices writing the letters as previously described.

Figure 16:
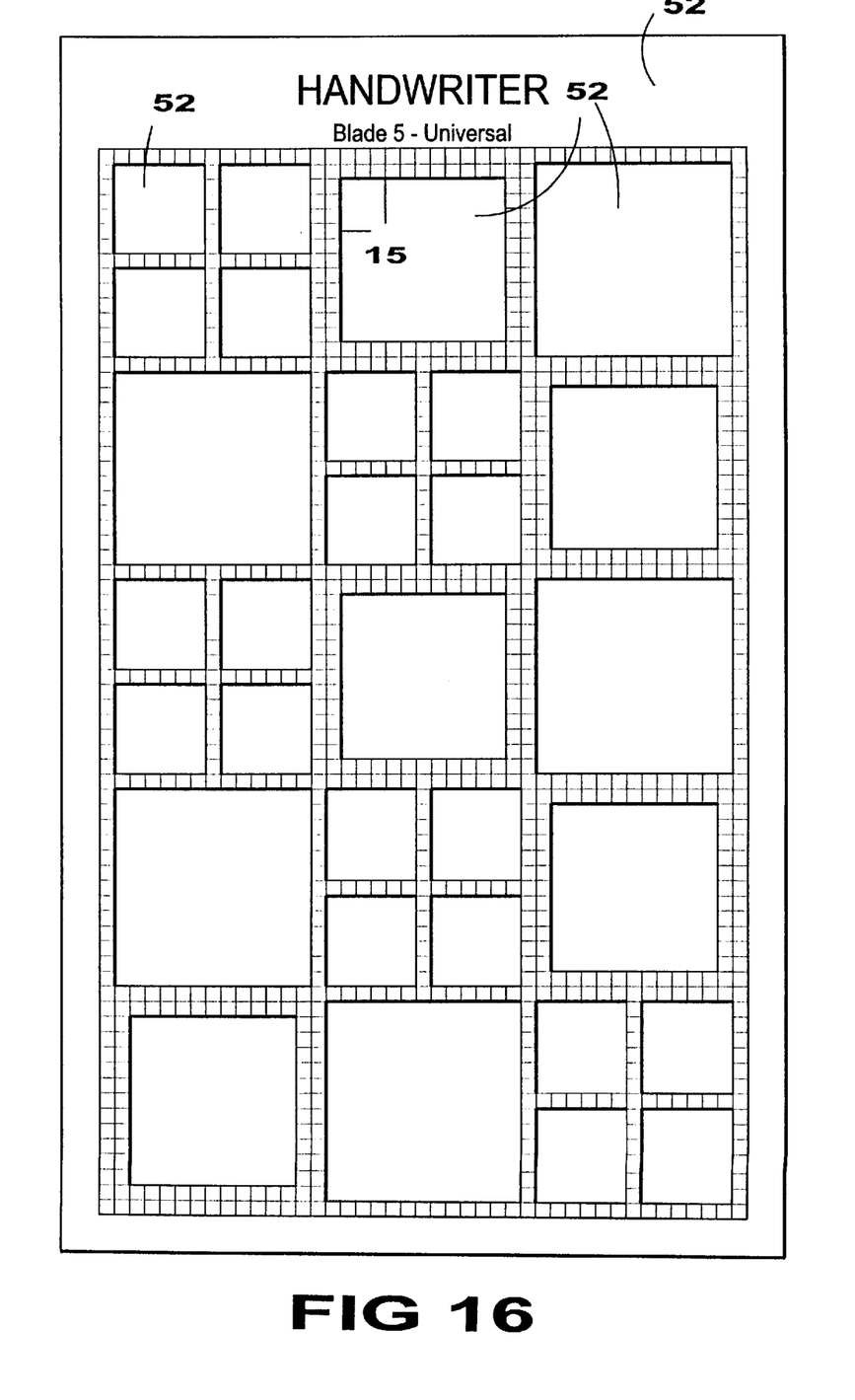
FIG. 16 is a top plan view of the universal template of the present invention wherein an individual can practice all figures with variable sizing.

Turning to FIG. 16, therein is shown a top plan view of the universal template 52 of the present invention 10 wherein an individual can practice writing all figures of variable sizes. As can be seen, FIG. 16 discloses numerous blank square blocks 52 wherein the user can practice writing using various sized blank blocks. Note that the boxes have lines 15 imprinted around the edges to aid the user in properly sizing the letter in the boxes 52.

What is claimed is new and desired to be protected by Letters Patent is set forth in the claims:

1. An apparatus for practicing handwriting, comprising:
   a) a template;
   b) a guide form for holding said template;
   c) said guide form further comprising a writing surface;
   d) a piece of paper;
   e) said guide form holding said piece of paper between said template and said guide form whereby the user can practice handwriting; and
   f) said template having boxes formed into rows and columns, a first of said columns containing symbols, said symbols selected from the group consisting of letters of the alphabet, numerals, and geometric shapes, a second of said columns adjacent said first column containing stencils, each stencil in each row corresponding to the symbol in the first column to permit practice drawing of the symbol on the paper underneath said template through the stencil, and a third of said columns having open boxes to permit the practice of writing the corresponding symbols on the paper under said template in the same row adjacent the stenciled symbol.

2. The apparatus of claim 1 in which each box on said template is imprinted with parallel lines around the edges thereof to aid the user in properly sizing the symbols.

3. The method for teaching handwriting, comprising the steps of:
   a) placing a blank sheet of writing paper on a guide form having a writing surface and a guide to receive and hold said sheet of paper in place;
   b) overlaying said sheet of paper on said writing surface with a template, said template having boxes formed into rows and columns, a first of said columns containing symbols, said symbols selected from the group consisting of letters of the alphabet, numerals, and geometric shapes, a second of said columns adjacent said first column containing stencils, each stencil in each row corresponding to the symbol in the first column to permit practice drawing of the symbol on the paper underneath said template through the stencil, and a third of said columns having open boxes;
   c) tracing a selected symbol shown in a box in the first column through the corresponding stencil in an adjacent box in the same row in the second column for practicing the formation of said selected symbol; and
   d) copying said selected symbol on said paper through an adjacent open box in a third column.

4. The method of claim 3 in which the user is assisted in properly sizing the selected symbol by each box on said template having parallel lines imprinted around the edges thereof.

\* \* \* \* \*